No. 699,285. Patented May 6, 1902.
B. L. CLOVER & A. GRABOWSKI.
CORE BOX CUTTER.
(Application filed May 8, 1901.)

(No Model.) 7 Sheets—Sheet 1.

Witnesses:

Inventors:
Benton L. Clover & Anton Grabowski
By Peirce & Fisher,
their Attorneys.

No. 699,285. Patented May 6, 1902.
B. L. CLOVER & A. GRABOWSKI.
CORE BOX CUTTER.
(Application filed May 8, 1901.)

(No Model.) 7 Sheets—Sheet 2.

Witnesses: Inventors:

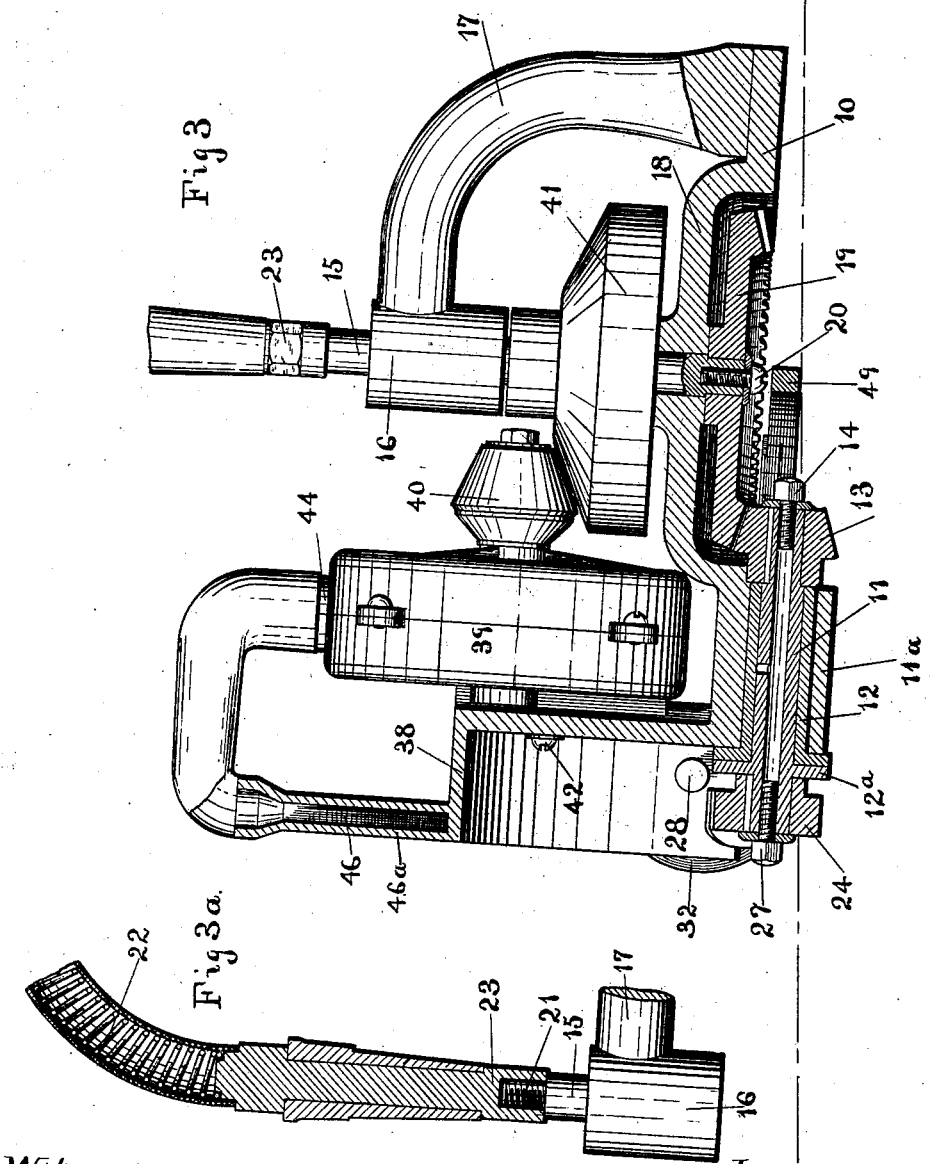

No. 699,285. Patented May 6, 1902.
B. L. CLOVER & A. GRABOWSKI.
CORE BOX CUTTER.
(Application filed May 8, 1901.)
(No Model.) 7 Sheets—Sheet 4.
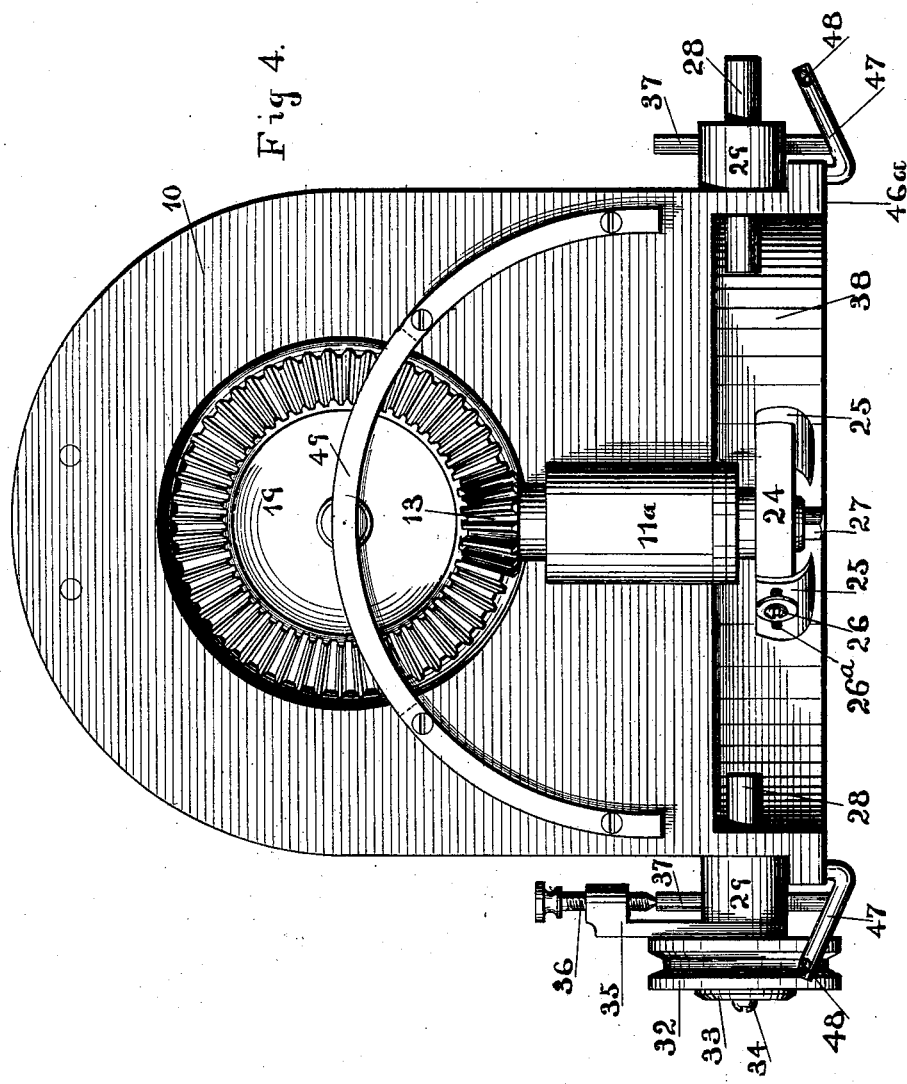

No. 699,285. Patented May 6, 1902.
B. L. CLOVER & A. GRABOWSKI.
CORE BOX CUTTER.
(Application filed May 8, 1901.)
(No Model.) 7 Sheets—Sheet 5.
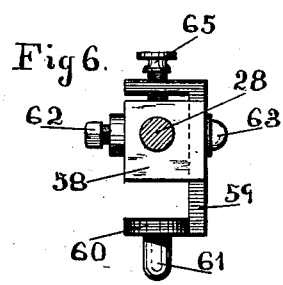
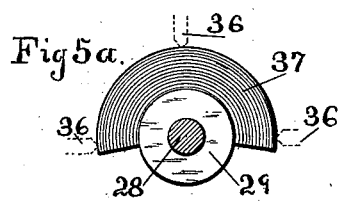
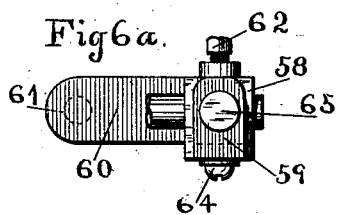
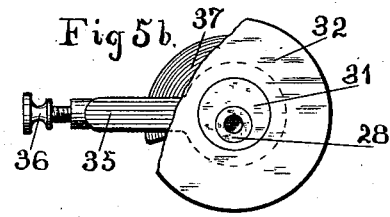
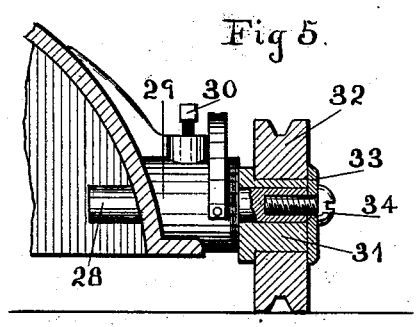
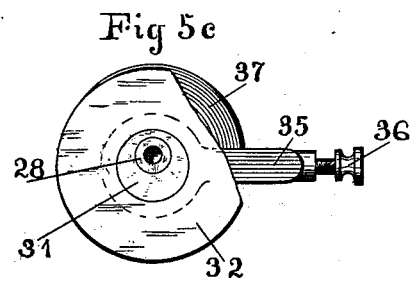
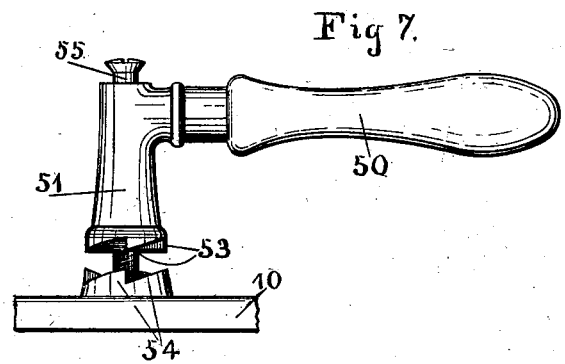
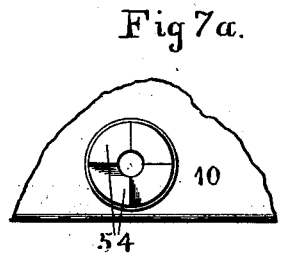

No. 699,285. Patented May 6, 1902.
B. L. CLOVER & A. GRABOWSKI.
CORE BOX CUTTER.
(Application filed May 8, 1901.)

(No Model.) 7 Sheets—Sheet 6.

Witnesses:
Torres H Alfords
Thomas Flach

Inventors:
Benton L. Clover
and Anton Grabowski
By Peirce & Fisher
their Attorneys

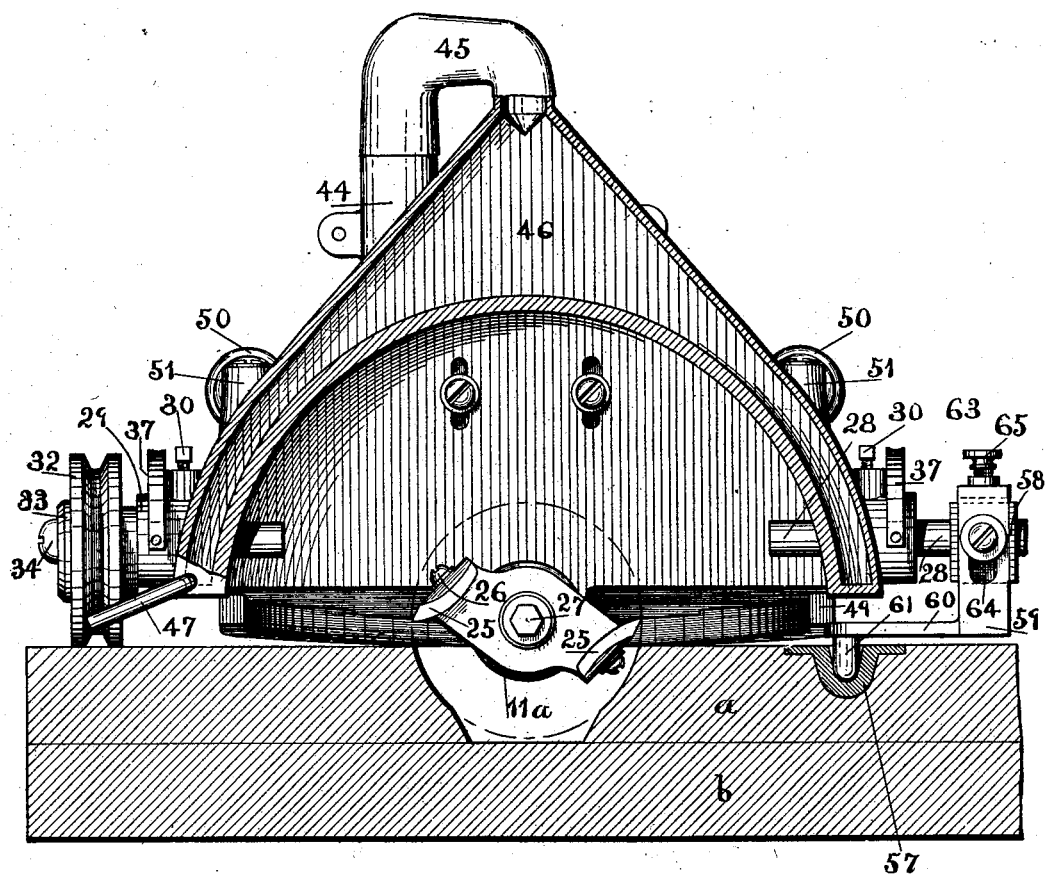

UNITED STATES PATENT OFFICE.

BENTON L. CLOVER AND ANTON GRABOWSKI, OF CHICAGO, ILLINOIS.

CORE-BOX CUTTER.

SPECIFICATION forming part of Letters Patent No. 699,285, dated May 6, 1902.

Application filed May 8, 1901. Serial No. 59,226. (No model.)

*To all whom it may concern:*

Be it known that we, BENTON L. CLOVER and ANTON GRABOWSKI, citizens of the United States, and residents of Chicago, county of Cook, State of Illinois, have invented certain new and useful Improvements in Core-Box Cutters, of which the following is declared to be a full, clear, and exact description.

The invention relates to machines for forming core-box sections in which the core to be formed may be of any desired shape. Such core-box sections must be formed with accuracy and at the present time are usually constructed by skilled hand labor, thus rendering their manufacture expensive and slow.

The object of our invention is to provide a simple and efficient machine by which the core-box sections of any desired formation may be accurately, quickly, and inexpensively manufactured.

The invention consists in the features set forth in the following description, illustrated in the accompanying drawings, and particularly pointed out in the appended claims.

Figure 1:
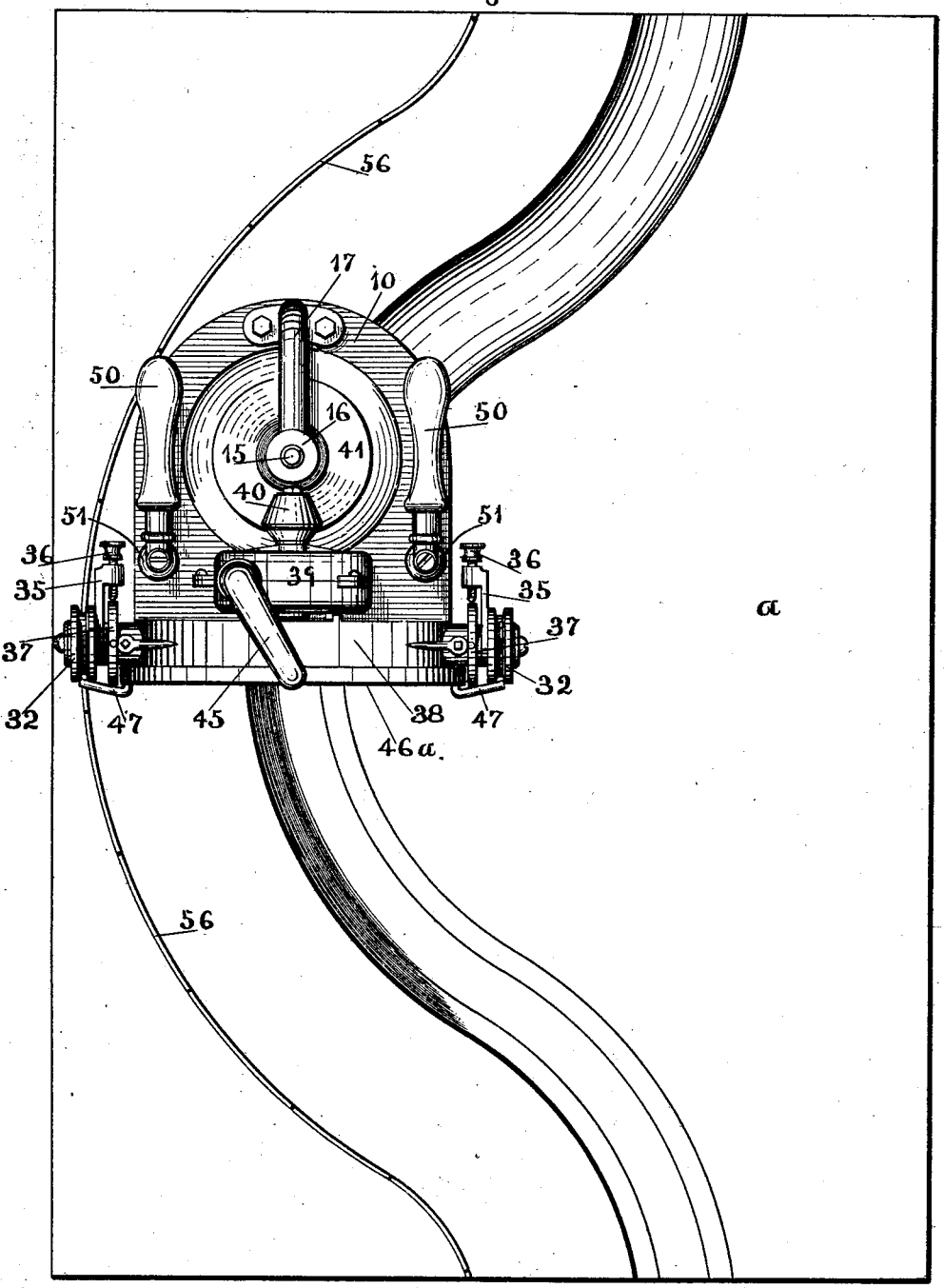
Figure 2:
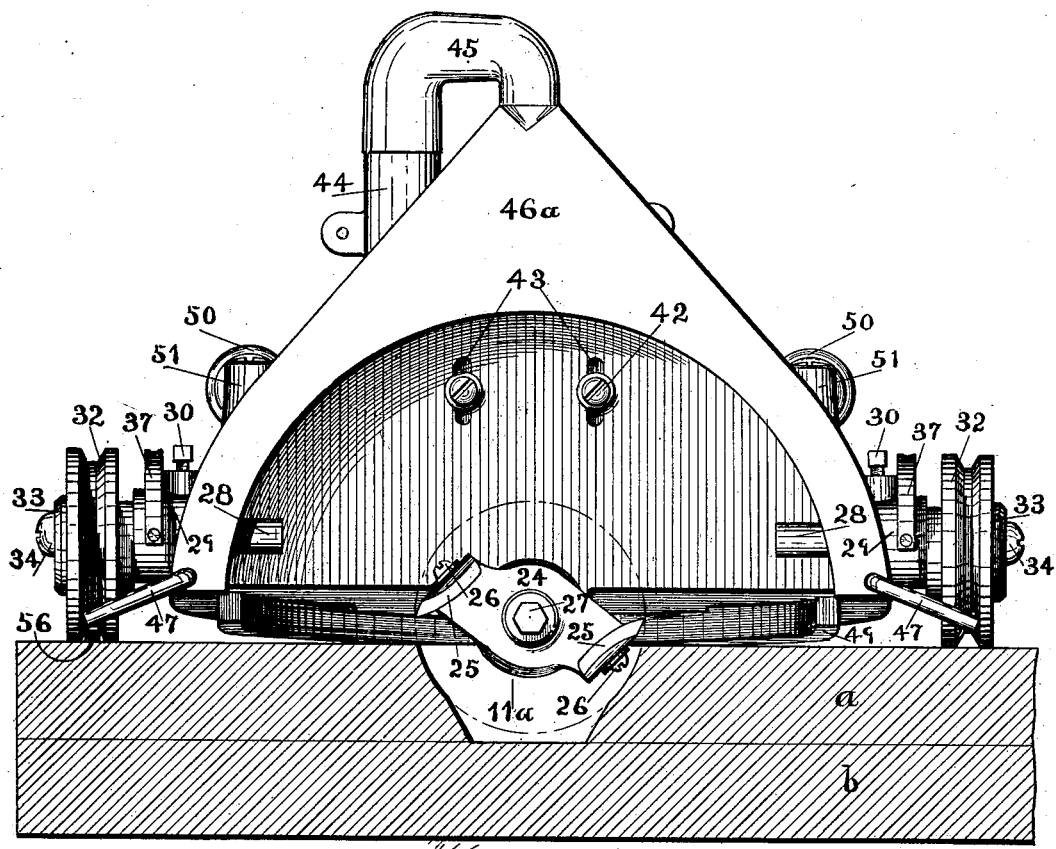
Figure 2:
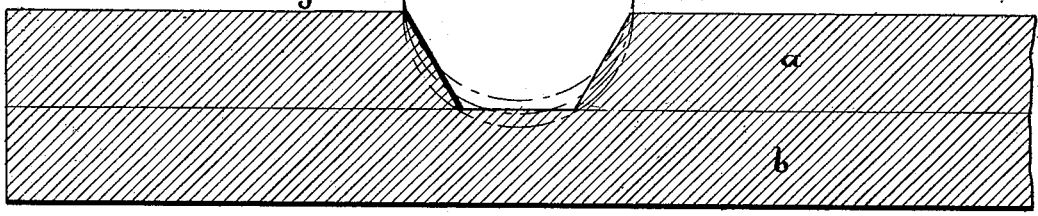
Figure 8:
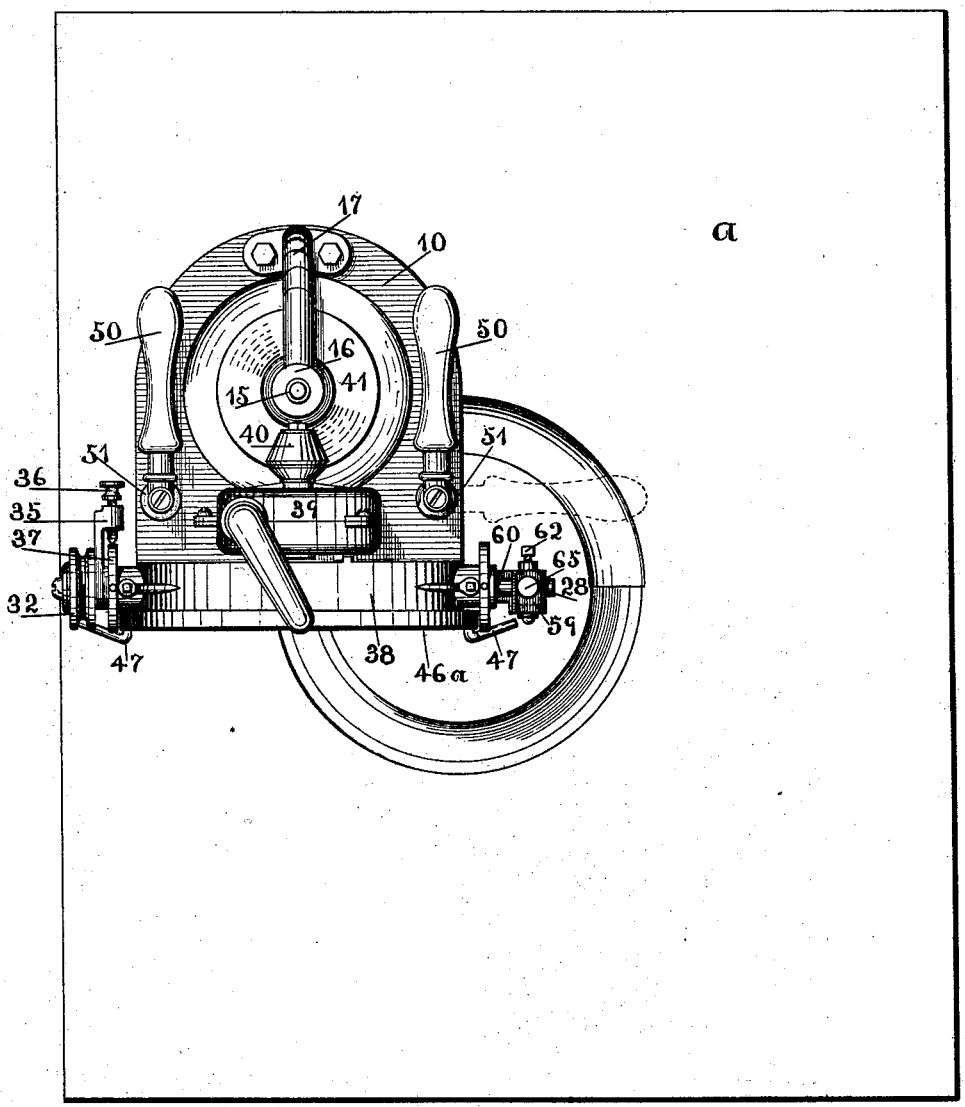

In the accompanying drawings, Figure 1 is a plan view of our improved device shown in operative position upon a core-box section. Fig. 2 is an end view, in vertical elevation, of the same, the core-box being shown in cross-section. Fig. 2ª is a sectional view of the core-box section with the groove as usually formed therein preparatory to being accurately outlined. Fig. 3 is a side view, in vertical elevation, of the core-box cutter, parts being shown in cross-section. Fig. 3ª is a detail view in section of the coupling between the flexible drive-shaft and the operating-shaft of the core-box cutter. Fig. 4 is an inverted plan view of the apparatus. Figs. 5, 5ª, 5ᵇ, and 5ᶜ are detail views of the adjustable guiding and supporting wheels. Figs. 6 and 6ª are detail views of a center device used when a circular groove is to be formed in the core-box section. Figs. 7 and 7ª are detail views of means for adjustably securing the controlling-handles to the frame of the cutter. Fig. 8 is a plan view of the core-box cutter in use to form a circular groove. Fig. 9 is a view in vertical section of the same.

Our improved core-box cutter comprises a frame which is adapted to travel upon the surface of the core-box section and which carries a revoluble cutter and operating-shaft therefor. Suitable adjustable supports or guide-wheels are provided, whereby the frame may be raised and lowered to adjust the revolving cutter to its work. Means are provided for coupling the cutter-operating shaft to a flexible drive-shaft, and means are provided by which the frame may be guided to form a groove in the core-box section of any desired shape.

In the forward end of a frame-plate 10 is journaled within a sleeve 11ª a short longitudinal stud-shaft 11, provided with a shouldered journal-box 12, of brass or other suitable material. A collar 12ª upon the shaft abuts against the forward end of the journal-box 12, and to the rear shouldered end of the shaft is keyed a beveled pinion 13, held in place by a washer and a bolt 14, threaded into the end of the shaft.

An upright operating-shaft 15 is journaled in the frame-plate 10 and within a bearing 16 on the upper end of a bent upright 17, bolted to the frame-plate. The shouldered lower end of the operating-shaft 15 projects within a recess formed by an upwardly-dished portion 18 of the frame-plate 10. Keyed to the shouldered lower end of the shaft to revolve within the recess is a beveled gear 19, held in place by a washer and a bolt 20, threaded into the end of the shaft and operatively engaging the beveled pinion 13 on the stud-shaft 12. The upper end of the operating-shaft 15 is provided with a threaded stud 21, by which a flexible or jointed drive-shaft 22 of any suitable construction may be connected to the operating-shaft 15 by means of a female coupling 23 in such a manner as to permit the free movement of the cutter over the surface of the core-box section.

To the forward end of the stud-shaft 12 is keyed a revoluble cutter 24 of any desired construction, but preferably comprising oppositely-disposed arms provided at their ends with cutting-blades 25, adjustably fixed thereto by threaded bolts 26 engaging transverse slots 26ª in the body of the cutting-blades. The cutter 24 is removably held in place by a washer and a bolt 27, threaded into the end of the stud-shaft, so that a cutting-tool of any desired diameter may be employed.

The frame 10 is provided on either side opposite the revolving cutter with short axles 28, which are adjustably held within sleeves 29 by means of bolts 30. To the outer ends of the axles 28 are fitted shouldered eccentric bearings 31 (see Fig. 5) for the supporting and guiding wheels 32, which are held in place by means of washers 33 and bolts 34, threaded into the ends of the axles. Each of the eccentric bearings 31 is provided with an arm or extension 35, through the outer end of which is threaded an adjustable locking-bolt 36, which is provided with a pointed end and adapted to engage depressions upon the periphery of quadrants 37, fixed to the sleeves 29. (See Figs. 5ª, 5ᵇ, and 5ᶜ.) In this manner the wheels 32 serve as gaging-supports by which the frame may be raised and lowered and the revolving cutter adjusted to its work. In order that this adjustment of the cutter may not be disturbed, means are provided for blowing away the shavings from in front of the wheels 32. A semicircular shield 38, preferably cast in piece with the frame-plate 10, is arranged about the position of the revolving cutter, and upon the rear face of this shield is mounted the frame 39 of a centrifugal blower of any suitable construction. The shaft of the blower is provided at its rear end with a beveled friction-wheel 40, with which operatively engages a beveled friction drive-wheel 41, keyed or otherwise fixed to the operating-shaft 15 intermediate its bearings. In order to compensate for any wear of these friction-surfaces, the frame 39 of the blower is adjustably secured in position by means of bolts 42, passing through longitudinal slots 43 in the rear portion of the shield 38. The outlet-pipe 44 of the blower is sleeved tightly within a bent hollow section 45, by which the blast is directed into a hollow chamber 46, which is formed in a semicircular flange cast or otherwise fixed to the forward end of the semicircular shield 38. To the lower ends of the hollow chamber 46 are fixed laterally-projecting pipes or tubes 47, having downwardly-opening orifices 48, (see Fig. 4,) by which the blast is directed directly in front of the gage-wheels 32.

The semicircular bearing-strip 49 is bolted to the under side of the frame-plate 10 and extends across the depression therein, as shown in Fig. 4, and serves to support the rear portion of the machine out of engagement with the upper face of the core-box section.

Horizontally-projecting handles 50 for controlling the movement of the cutter are mounted upon uprights 51, the lower faces of which are provided with beveled teeth 53, adapted to engage with similar beveled teeth 54 upon the frame-plate 10, as shown in Figs. 7 and 7ª. By this arrangement the handles 50 may be adjusted and firmly secured in place by means of the threaded bolts 55.

Means are preferably provided for guiding the movement of the device. If a compound curve is to be formed or one of irregular outline, a pattern-guide 56 is employed, preferably in the form of a flexible strip of brass or other suitable material provided at intervals with nail-holes by which it may be adjustably secured in proper position upon the upper face of the core-box section, as clearly indicated in Fig. 1. The wheels 32 are grooved, as shown, so as to engage with and track upon the flexible pattern-guide 56.

The operation is as follows: The core-box section is constructed in the usual manner of separate pieces $a$ and $b$, nailed together, and preferably a groove of the desired shape, but rectangular in contour, is formed in the upper piece of the section, as shown in Fig. 2ª. Such a groove is usually so formed and requires little time and no especial skill. When the section is formed by hand, the contour of the groove is then accurately outlined by means of gouge-chisels. With this method it is often necessary to divide the core-box into separate sections in order to permit the manipulation of the hand-tools and always necessitates the expenditure of considerable time and skill. With our improved cutter this step may be accurately and quickly carried out.

If the groove in the core-box section is of irregular shape, the pattern-guide 56 will be first secured in proper position upon the upper surface of the core-box section. A cutter or knife of the proper size will be fixed upon the shouldered end of the stud-shaft 12 and the operating-shaft 15, coupled to the flexible or jointed drive-shaft 22. The operator may then by grasping the handles 50 move the apparatus over the surface of the core-box section, with one of the wheels tracking upon the pattern-guide 56. Such an operation requires little skill, and the groove can be accurately outlined by a series of cuts, as indicated in Fig. 2ª. The depth of the cut of the knife will be regulated, as previously stated, by adjusting the eccentric bearings of the wheels 32. If a circular groove is to be formed, (see Figs. 8 and 9,) a centering-socket 57 will be properly located in the upper surface of the core-box section. One of the wheels 32 will be removed, and in its stead a block 58 will be placed upon the end of the axle 28. This block carries a rectangular-shaped piece 59, having a projecting arm 60, to the end of which is fixed a stud 61, adapted to engage the centering-socket 57. The block 58 is secured to the axle 28 by means of a threaded bolt 62, so that its position may be adjusted for circular grooves of different degrees of curvature. The part 59 is secured to the block 58 by means of a washer and a threaded bolt 63, which engages a longitudinal slot 64 therein, as clearly shown in Fig. 9. This construction permits the frame to be raised and lowered to adjust the position of the cutter by means of a thumb-bolt 65, which is threaded through the bent upper portion of the piece 59 and engages the upper surface of the block 58. (See Figs. 6 and 6ª.) The shield 38 will prevent the scattering of the shavings from the knife, and the blast from the centrifugal blower will be directed, as previously stated, to keep the path of the gage-wheels clear, so that the adjustment of the knife to its work will not be disturbed. It is desirable also that the frame of the machine should be of sufficient weight to hold the cutting-blades accurately in position during their operation.

It is obvious that numerous changes may be made by the skilled mechanic in the details of the apparatus without departure from the essentials of the invention.

Having described our invention, what we claim as new, and desire to secure by Letters Patent, is—

1. In core-box cutters, the combination with a movable frame adapted to travel upon the surface of the work, of a cutter revolubly mounted in said frame to rotate in a plane at right angles to the travel thereof, an operating-shaft for said cutter journaled in the frame and flexible driving mechanism connected to said shaft.

2. In core-box cutters, the combination with a movable frame adapted to travel upon the surface of the core-box section, of a cutter revolubly mounted thereon arranged to shape a core-box groove in such section below the surface thereof, an operating-shaft for said cutter mounted in the frame and flexible driving mechanism connected to said shaft.

3. In core-box cutters, the combination with a movable frame adapted to travel upon the surface of the core-box section, of a cutter revolubly mounted thereon arranged to shape a core-box groove in such section below the surface thereof, flexible driving mechanism connected to said cutter and a pattern-guide for controlling the travel of said frame.

4. In core-box cutters, the combination with the movable frame adapted to travel upon the surface of the work, of a revoluble cutter and an operating-shaft therefor, carried by said frame, flexible driving mechanism connected to said operating-shaft, gaging-supports for said frame and adjustable eccentrics for said supports whereby the cutter is held in proper relation with its work.

5. In core-box cutters, the combination with a movable frame adapted to travel upon the surface of the work, of a cutter revolubly mounted in said frame to rotate in a plane at right angles to the travel thereof, an operating-shaft for said cutter carried by the frame and adjustable gaging-supports for said frame, whereby said cutter may be adjusted to its work.

6. In a core-box cutter, the combination with a movable frame having wheels for supporting the same upon the surface of the work, of a cutter revolubly mounted in said frame to rotate in a plane at right angles to the travel thereof, an operating-shaft for said cutter carried by the frame, flexible driving mechanism connected to said operating-shaft, and adjustable eccentric bearings for said supporting-wheels to raise and lower the frame, whereby said cutter may be adjusted to its work.

7. The combination with a movable frame adapted to travel upon the surface of the work and with a revoluble cutter and operating-shaft therefor carried by the frame, of a flexible pattern-guide for controlling the travel of said frame.

8. The combination with a movable frame adapted to travel upon the surface of the work, of a cutter revolubly mounted on said frame to rotate in a plane at right angles to the travel thereof, an operating-shaft for said cutter carried by the frame, flexible driving mechanism connected to said operating-shaft, and means for guiding the travel of said frame.

9. The combination with a flexible pattern-guide adapted to be adjustably fixed in place, of a movable frame having means for engaging said guide, a cutter revolubly mounted in said frame to rotate in a plane at right angles to the travel thereof, an operating-shaft for said cutter carried by said frame and flexible driving mechanism connected to said operating-shaft.

10. The combination with a flexible pattern-guide adapted to be adjustably secured to the surface of the work, of a movable frame adapted to travel upon the surface of the work having wheels for tracking on said pattern-guide, and a revoluble cutter and operating means therefor mounted on said frame.

11. The combination with a flexible pattern-guide adapted to be adjustably secured to the surface of the work, of a movable frame having wheels for tracking on said pattern-guide, a cutter revolubly mounted in said frame to rotate in a plane at right angles to the travel thereof, an operating-shaft for said cutter carried by the frame, flexible driving mechanism connected to said operating-shaft and means for adjusting said guide-wheels to raise and lower said frame, whereby said cutter may be adjusted to its work.

12. In core-box cutters, the combination with a movable frame adapted to travel upon the surface of the work, of a revoluble cutter and operating means therefor carried by the frame, gaging-supports for said frame to hold the cutter in proper relation with its work, a blower and operating means therefor carried by the frame, and means for directing the blast from said blower in front of said gaging-supports.

13. In core-box cutters, the combination with a movable frame adapted to travel upon the surface of the work, of a revoluble cutter and operating-shaft therefor on said frame, adjustable supporting-wheels for said frame to hold the cutter in proper relation with its work, a blower carried by said frame and arranged to be driven from said operating-shaft, and means for directing the blast from the blower in front of said adjustable supporting-wheels.

14. In core-box cutters, the combination with a movable frame having supporting-wheels and adapted to travel upon the surface of the work, of a stud-shaft mounted in said frame to rotate in a plane at right angles to the travel thereof, an operating-shaft carried by the frame at right angles to said stud-shaft, a revoluble cutter removably secured to said stud-shaft, interengaging beveled gears fixed to said stud-shaft and to said operating-shaft, and means for coupling said operating-shaft to a flexible drive-shaft.

15. In core-box cutters, the combination with a movable frame adapted to travel upon the surface of the work, of a stud-shaft and an operating-shaft revolubly mounted in said frame, a revoluble cutter carried by said stud-shaft and interengaging gears on said stud-shaft and said operating-shaft, adjustable supports for raising and lowering said frame to adjust said cutter to its work, a blower carried by said frame, a friction-wheel on the shaft of said blower, a friction drive-wheel engaging the same fixed to said operating-shaft, and means for directing the blast from said blower in front of said adjustable supports.

16. In core-box cutters, the combination with a movable frame having supporting-wheels and arranged to travel upon the surface of the work, of a stud-shaft mounted on said frame to rotate in a plane at right angles to the travel thereof, a cutter removably secured to said stud-shaft, an operating-shaft carried by the frame at right angles to said stud-shaft, interengaging beveled gears fixed to said stud-shaft and to said operating-shaft, means for adjusting said supporting-wheels for raising and lowering said frame to hold said cutter in proper relation with its work, a centrifugal blower carried by said frame, a friction-wheel on the shaft of said blower, a friction drive-wheel engaging the same and fixed to said operating-shaft, means for directing the blast from said blower in front of said supporting-wheels, means for coupling said operating-shaft to a flexible drive-shaft and means for controlling the travel of said frame.

17. In core-box cutters, the combination with a frame arranged to move over the surface of the work, of a cutter revolubly mounted on said frame to rotate in a plane at right angles to the travel thereof, an operating-shaft for said cutter carried by the frame, means for driving said shaft during the movement of the frame and means for guiding the movement of the frame, substantially as described.

BENTON L. CLOVER.
ANTON GRABOWSKI.

Witnesses:
ALBERTA ADAMICK,
THOMAS R. FLACK.